(12) United States Patent
Stengel (10) Patent No.: US 7,957,715 B2
(45) Date of Patent: Jun. 7, 2011

(54) SPECTRALLY CONSTRAINED LOCAL OSCILLATOR SWITCHING

(75) Inventor: Robert E. Stengel, Pompano Beach, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 544 days.

(21) Appl. No.: 12/121,102

(22) Filed: May 15, 2008

(65) Prior Publication Data

US 2009/0286500 A1    Nov. 19, 2009

(51) Int. Cl.
*H04B 1/26* (2006.01)
(52) U.S. Cl. .................. 455/313; 455/318; 455/323
(58) Field of Classification Search .......... 455/205, 455/227, 313, 314, 315, 317, 318, 323; 375/316, 375/328, 332
See application file for complete search history.

(56) References Cited

U.S. PATENT DOCUMENTS

| 7,805,124 | B2 * | 9/2010 | Friedrich et al. | 455/323 |
| 2004/0113833 | A1 * | 6/2004 | Lee | 455/227 |
| 2005/0170807 | A1 * | 8/2005 | Rebel | 455/313 |
| 2008/0003971 | A1 * | 1/2008 | Vaisanen | 455/323 |

OTHER PUBLICATIONS

K.J. Kuntz et al—"Pulse Shaping and Signal Modulation Techniques to Imporove the Multipath and Noise Performance of Nartrowband Precision RF Ranging" —2002 IEEE Canadian Conference on Electrical & Computing Engineering—pp. 358-363.
Harold P.E. Stern et al—Ni Developer Zone—National Instruments Corp—Communication Systems: Analysis and Design—20041—17 pages.

* cited by examiner

*Primary Examiner* — Thanh C Le (57) ABSTRACT

A method and frequency converter for a radio rapid frequency signal scanning and including a local oscillator signal synthesis source (112) producing a local oscillator signal (502) with local oscillator bursts (210). The local oscillator bursts (210) contain pulse width modulated RF frequency pulses (602). Each local oscillator burst having, for a pre-determined duration, RF frequency pulses within an effective amplitude above a pre-determined threshold (260). Each local oscillator burst (210) having also has effective amplitude pulse shaping envelope (504) that reduces at least one frequency domain component magnitude (310) of the local oscillator signal (300). A radio frequency mixer (110) receives an RF signal input (104) and the local oscillator signal to produce an output signal (160) at a frequency related to a combination of a frequency of the RF signal input and a frequency of the local oscillator signal.

20 Claims, 5 Drawing Sheets

SPECTRALLY CONSTRAINED LOCAL OSCILLATOR SWITCHING

FIELD OF THE INVENTION

The present invention generally relates to the field of radio frequency signal receivers and more particularly relates to local oscillators used to rapidly switch between or among different receive radio frequencies.

BACKGROUND OF THE INVENTION

Some RF receivers operate by rapidly switching the center RF frequency being received and processed. One method of operation for these receivers includes periodically changing the RF frequency of the receiver's local oscillator between or among the frequencies required to cause the receiver to sequentially receive and process the several desired receive frequencies. The sequentially changing RF frequencies of the local oscillator are able to be modeled as interleaved bursts of RF frequency signals with alternating RF frequencies at each of the sequential local oscillator frequencies.

Each of these RF bursts can then be thought of as time division multiplexed into a composite, multi-frequency local oscillator signal of a receiver. Receivers that abruptly activate or change local oscillator frequencies essentially create a local oscillator output burst with a square shaped amplitude envelope. Such a square shaped amplitude envelope causes the local oscillator output to have a frequency domain spectrum that corresponds to the well-known SINC function, which is defined by the equation $\sin(f)/f$, centered around each of the local oscillator center frequencies. The SINC function spectrum of this local oscillator output is able to introduce new, undesired, local oscillator spurs as a result of the periodic local oscillator frequency changing. These spurs for square wave local oscillator time domain envelopes can reach −13 dBc and introduce potential receiver interference opportunities as these spurs will also mix in the receiver's mixer with receive signals removed in frequency from the desired signal and be down-converted to the same intermediate frequency.

Therefore a need exists to overcome the problems with the prior art as discussed above.

SUMMARY OF THE INVENTION

Briefly, in accordance with the present invention, disclosed are a method for converting a frequency of a radio frequency signal includes producing a two or three state local oscillator signal. The two or three state local oscillator signal voltage or current amplitude is suitable for the switching function associated with the receiver down converter or the transmitter up converter used in wireless transceiver systems. The local oscillator signal includes at least one local oscillator burst with each local oscillator burst within the at least one local oscillator burst including a respective plurality of RF frequency pulses. The method further includes time domain pulse width modulating each two or three state RF frequency pulse within the plurality of RF frequency pulses with a respective time domain pulse width modulation, thereby resulting in a respective effective amplitude of each RF frequency pulse within the plurality of RF frequency pulses based upon a respective time domain pulse width modulation. Each of the at least one local oscillator burst has, for a pre-determined duration, RF frequency pulses with an effective amplitude above a pre-determined threshold. Each of the at least one local oscillator burst has RF frequency pulses with respective effective amplitudes that define an effective amplitude pulse shaping envelope for each of the at least one local oscillator burst, where the effective amplitude pulse shaping envelope reduces at least one frequency domain component magnitude of the local oscillator signal. The method further includes mixing an RF signal input and the local oscillator signal to produce an output signal representing the RF signal input at a frequency related to a combination of a frequency of the RF signal input and a frequency of the local oscillator signal.

In another embodiment, a frequency converter for a radio frequency signal includes a local oscillator that produces a local oscillator signal with at least one local oscillator burst. Each local oscillator burst within the at least one local oscillator burst includes a respective plurality of RF frequency pulses. Each RF frequency pulse within the plurality of RF frequency pulses has a respective effective amplitude based upon a respective time domain pulse width modulation of each RF frequency pulse. Each of the at least one local oscillator burst has, for a pre-determined duration, RF frequency pulses with an effective amplitude above a pre-determined threshold. Each of the at least one local oscillator burst has RF frequency pulses with respective effective amplitudes that define an effective amplitude pulse shaping envelope for each of the at least one local oscillator burst. The effective amplitude pulse shaping envelope reducing at least one frequency domain component magnitude of the local oscillator signal. The frequency converter for a radio frequency signal further includes a radio frequency mixer, coupled to the local oscillator, that receives an RF signal input and the local oscillator signal. The radio frequency mixer produces an output signal representing the RF signal input at a frequency related to a combination of a frequency of the RF signal input and a frequency of the local oscillator signal.

In yet another embodiment, a rapidly changing received frequency receiver includes an RF signal processor adapted to receive RF signals and produced a conditioned received RF signal. The rapidly changing received frequency receiver also includes a local oscillator producing a local oscillator signal that includes at least one local oscillator burst. Each local oscillator burst within the at least one local oscillator burst comprising a respective plurality of RF frequency pulses, each RF frequency pulse within the plurality of RF frequency pulses having a respective effective amplitude based upon a respective time domain pulse width modulation of each RF frequency pulse. Each of the at least one local oscillator burst has, for a pre-determined duration, RF frequency pulses within an effective amplitude above a pre-determined threshold. Each of the at least one local oscillator burst has RF frequency pulses with respective effective amplitudes that define an effective amplitude pulse shaping envelope for each of the at least one local oscillator burst. The effective amplitude pulse shaping envelope reduces at least one frequency domain component magnitude of the local oscillator signal. The rapidly changing received frequency receiver further includes a radio frequency mixer, coupled to the local oscillator and the RF signal processor. The radio frequency mixer accepts the conditioned received RF signal and the local oscillator signal. The radio frequency mixer producing an output signal representing the RF signal input at a frequency related to a combination of a frequency of the RF signal input and a frequency of the local oscillator signal.

An advantage of the foregoing embodiments of the present invention is that local oscillator signals that switch between two or more frequencies, or that are switched on and off, are able to be produced with reduced spectral bandwidth. The local oscillator signals further have much lower magnitude non-harmonic frequency components other than the desired local oscillator frequency as compared to local oscillator signals that abruptly switch between or among frequencies.

One embodiment of the present invention uses pulse width modulation of the local oscillator RF pulses to implement effective amplitude pulse shaping of local oscillator bursts at a selected frequency. Using pulse width modulation to perform effective envelope pulse shaping of local oscillator bursts results in maintaining the reduced frequency spectrum bandwidth of the pulse shaped waveform with two or three fixed magnitude states suitable for the switching signal of a RF mixer.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

DETAILED DESCRIPTION

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

The term wireless communication device is intended to broadly cover many different types of devices that can wirelessly receive signals, and optionally can wirelessly transmit signals, and may also operate in a wireless communication system. For example, and not for any limitation, a wireless communication device can include any one or a combination of the following: a cellular telephone, a mobile phone, a smartphone, a two-way radio, a two-way pager, a wireless messaging device, a laptop/computer, automotive gateway, and a residential gateway.

Figure 1:
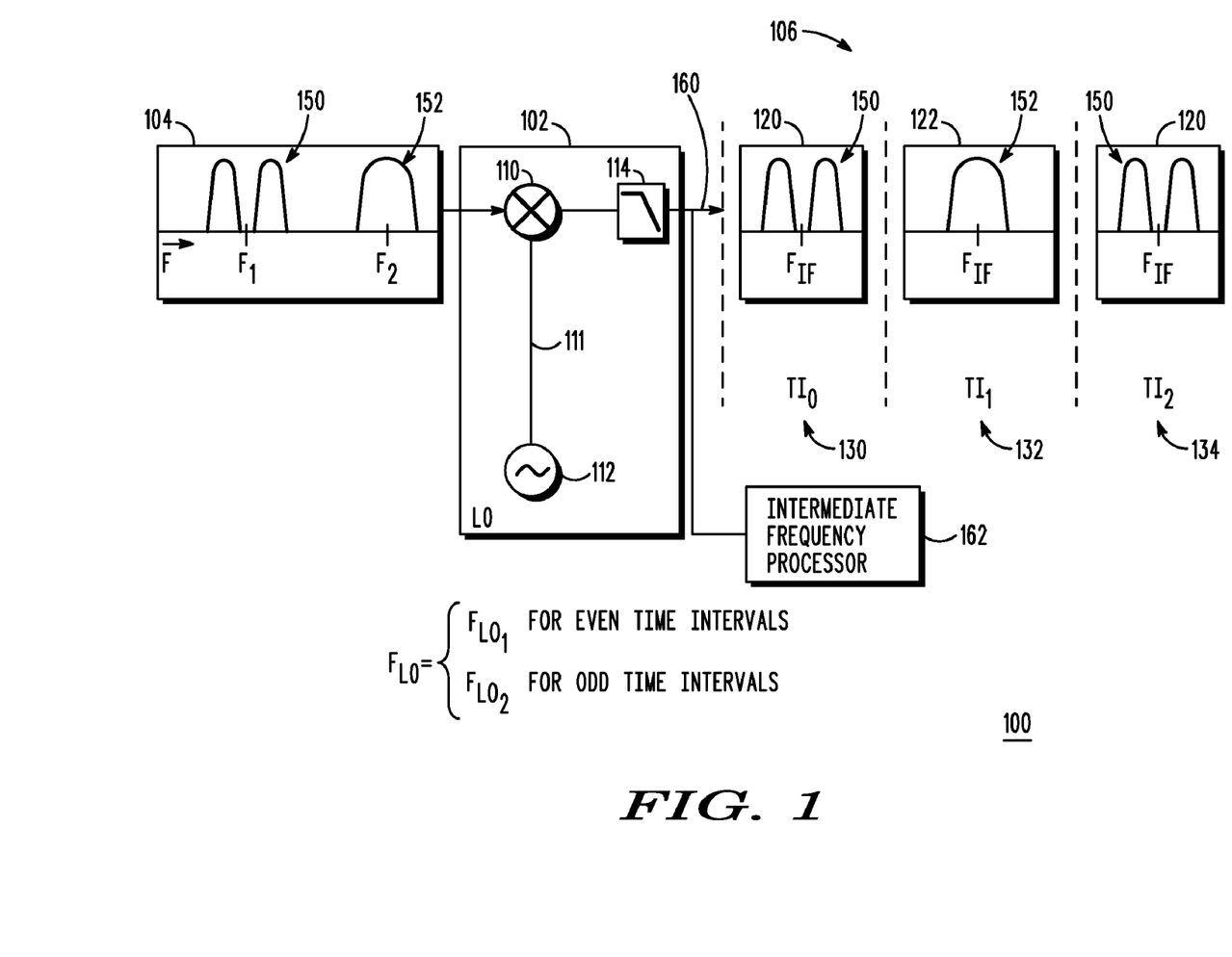
FIG. 1 illustrates signal processing environment of a rapidly changing received frequency receiver, according to one embodiment of the present invention.

FIG. 1 illustrates signal processing environment 100 of a rapidly changing received frequency receiver 102, according to one embodiment of the present invention. The signal processing environment 100 illustrates a received frequency spectrum 104 with a dual peak signal 150 present in the vicinity of $F_1$ and a broad band signal 152 in the vicinity of $F_2$. The received frequency spectrum 104 in one embodiment of the present invention is processed by a rapidly changing received frequency receiver 102.

The rapidly changing received frequency receiver 102 of one embodiment of the present invention switches between two receive center frequencies, e.g., $F_1$ and $F_2$ for the illustrated example. The illustrated rapidly changing received frequency receiver 102 depicts the relevant processing portions used to produce an intermediate frequency output 160 but does not include all of the components of such a receiver in order to simplify the description of the relevant portions of one embodiment of the present invention.

The rapidly changing received frequency receiver 102 of one embodiment of the present invention includes a conventional signal mixer 110. Further embodiments of the present embodiment are able to use any suitable receive frequency conversion components to process a received radio frequency signal based upon a local oscillator input. The operations of the conventional signal mixer 110 of one embodiment effectively hard limits the local oscillator input into the mixer, such as by the operation of a diode ring or other phase switching circuitry commonly incorporated into signal mixers, thereby removing any amplitude modulation that is present on the local oscillator signal.

The rapidly changing received frequency receiver 102 of one embodiment periodically switches the radio frequency of a local oscillator signal synthesis source 112 between two local oscillator output radio frequencies, $F_{lo1}$ and $F_{lo2}$, so as to cause the rapidly changing received frequency receiver 102 to alternately receive one of the two different received radio frequencies, $F_1$ and $F_2$, respectively. In the following discussion, the "radio frequency" signal produced by a local oscillator signal synthesis source 112 is referred to as the local oscillator RF frequency. As described in detail below, the local oscillator signal synthesis source 112 of one embodiment uses pulse shaping of the amplitude envelope for each local oscillator burst so as to reduce the frequency bandwidth spectrum of the local oscillator output 111. The local oscillator signal synthesis source can be implemented with phase locked loop (PLL), direct digital synthesis (DDS), or digital PLL signal synthesis systems.

Further embodiments of the present invention are able to switch the output radio frequency of the local oscillator signal synthesis source 112 among any practical number of local oscillator RF frequencies in order to cause the rapidly changing received frequency receiver 102 to sequentially receive a corresponding number of received radio frequencies. Yet further embodiments of the present invention include a local oscillator signal synthesis source 112 that produces local oscillator bursts at a single local oscillator RF frequency in order to cause the rapidly changing received frequency receiver 102 to receive signals at one RF frequency only during the presence of the local oscillator bursts.

The conventional signal mixer 110 produces a down-converted representation of the received frequency spectrum 104 based upon the local oscillator RF output produced by the local oscillator signal synthesis source 112. The output of the conventional signal mixer 110 is provided to a low pass filter 114 that removes higher frequency components from the output signal 160 of the rapidly changing received frequency receiver 102 and delivers an intermediate frequency (IF) signal for subsequent processing. In one embodiment of the present invention, an intermediate frequency processor 162 processes the output signal 160 as required by the particular application of the rapidly changing received frequency receiver 102.

The output signal 160 of the rapidly changing received frequency receiver 102 is shown to contain a series of time intervals that alternate between a first IF signal 120 that includes the first received signals 150 that are centered at radio frequency F1 and a second IF signal 122 that include the second received signals 152. For example, the output signal 160 at Time Interval 0 (TI$_0$) 130 includes the first IF signal output 120 because local oscillator 112 is producing $F_{lo1}$ during that time interval. The output signal 160 at Time Interval 1 (TI$_1$) 132 includes the second IF signal output 122 because local oscillator 112 is producing $F_{lo2}$ during that time interval. The output signal 160 at Time Interval 2 (TI$_2$) 134 returns to including the first IF signal output 120 because local oscillator 112 is again producing $F_{lo1}$ during that time interval.

Figure 2:
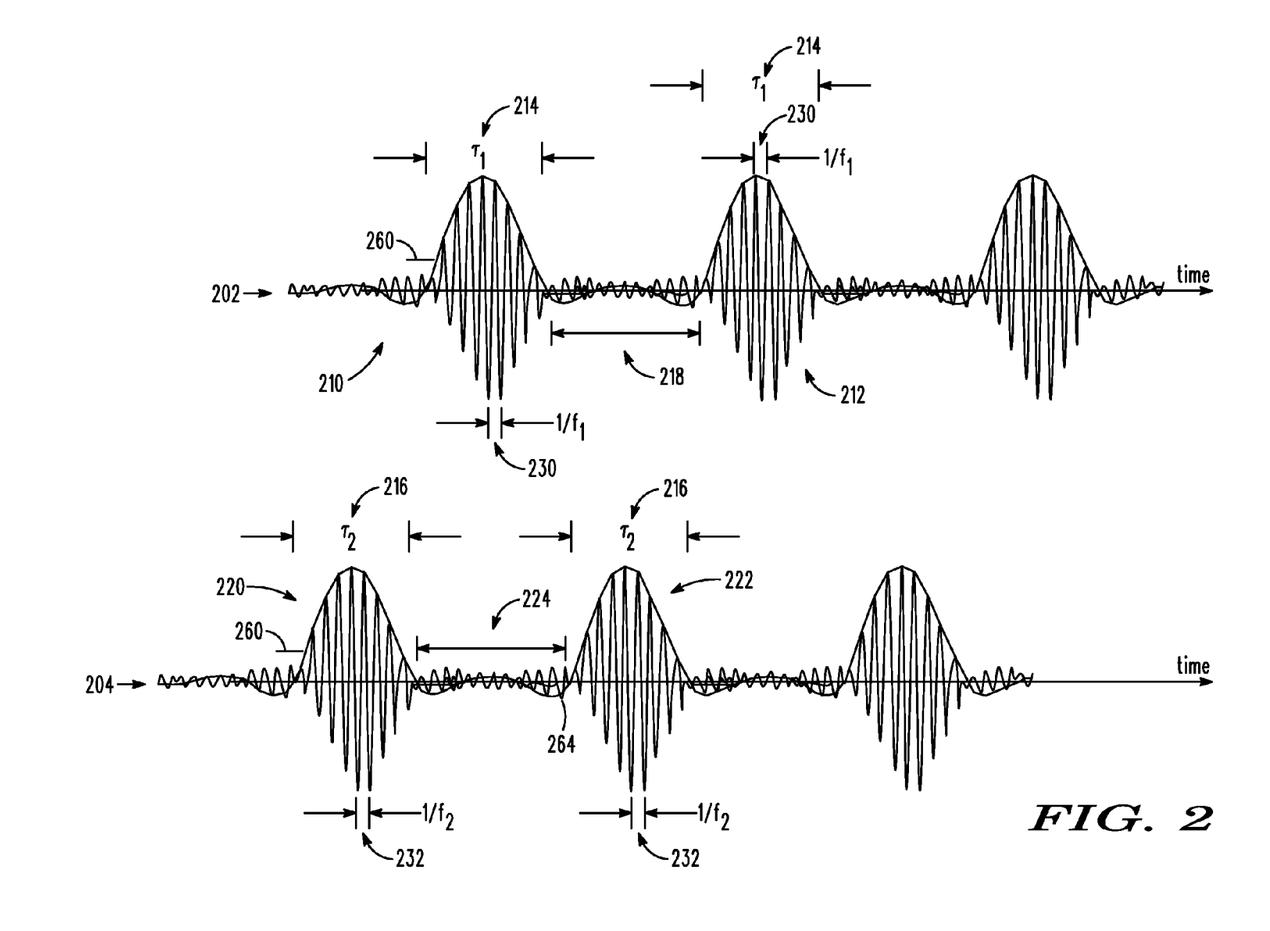
FIG. 2 illustrates a local oscillator time domain profile for a periodically frequency switching local oscillator output, according to one embodiment of the present invention.

FIG. 2 illustrates a local oscillator time domain profile 200 for a periodically frequency switching local oscillator output, according to one embodiment of the present invention. In order to help confine the radio frequency spectrum of the local oscillator output when switching the radio frequency of the local oscillator output between two values, one embodiment of the present invention implements an effective amplitude envelope pulse shaping of bursts of the local oscillator RF components as is illustrated in FIG. 2.

The local oscillator signal synthesis source 112 of one embodiment of the present invention produces a composite waveform that can be analyzed as a superposition of two signal components that each has a pre-determined radio frequency corresponding to $F_{lo1}$ and $F_{lo2}$. These two signal components each have a radio frequency signal burst with a pulse shaping amplitude envelope defined in the time domain by a sin(t)/t SINC function. These radio frequency signal bursts occur at each time interval that the rapidly changing received frequency receiver 102 tunes to a received radio frequency corresponding to that local oscillator frequency.

The local oscillator time domain profile 200 illustrates a time domain profile for each of these two local oscillator signal components: a first local oscillator RF component 202 and a second local oscillator RF component 204. The first local oscillator RF component 202 and the second local oscillator RF component 204 are separately illustrated to more clearly show the pulse shaping of the local oscillator signal at each of the two radio frequencies. The local oscillator signal synthesis source 112 of one embodiment produces a combination of these two local oscillator RF components.

The first radio frequency local oscillator component 202 shows a pulse-shaped amplitude envelope burst that includes a first local oscillator RF first amplitude envelope burst 210 and a first local oscillator RF second amplitude envelope burst 212. These two first local oscillator RF amplitude envelope bursts are separated by a first local oscillator amplitude envelope inter-burst period 218. The first local oscillator RF first amplitude envelope burst 210 and the first local oscillator RF second amplitude envelope burst 212 are shown to have an amplitude envelope defined in the time domain by a sin(t)/t SINC function with a main lobe "burst" with of $\tau_1$ 214 that corresponds to the duration of the time interval that the rapidly changing received frequency receiver 102 will process the received radio frequency signal corresponding to $F_{lo1}$. The first radio frequency time period 230 for the first local oscillator RF component 202 is $1/\tau_1$, which corresponds to $F_{lo1}$.

The second local oscillator RF component 204 shows a pulse-shaped amplitude envelope burst that is similar to the first local oscillator RF component 204, with the exception that the phase of the amplitude envelope burst is offset and the radio frequency of this local oscillator component is at the second local oscillator radio frequency $F_{lo2}$. The second local oscillator RF first burst 220 and the second local oscillator RF second burst 222 are shown to be separated by a second local oscillator amplitude envelope inter-burst period 224 and to occur during the low amplitude portions of the envelope of the first local oscillator RF component 202, i.e., during the first local oscillator amplitude envelope inter-burst period 218. The second local oscillator first RF burst 220 and the second local oscillator second RF burst 222 are shown to also have a time domain amplitude envelope defined by a sin(t)/t SINC function with a main lobe "burst" with period of $\tau_2$ 216 that corresponds to the duration of the time interval that the rapidly changing received frequency receiver 102 will process the received radio frequency signal corresponding to $F_{lo2}$. Various embodiments of the present invention are able to utilize $\tau_1$ 214 and $\tau_2$ 216 that are either equal or different from one another based upon the requirements for their applications. The second radio frequency time period 232 for the second local oscillator RF component 204 is shown to be $1/\tau_2$, which corresponds to $F_{lo2}$.

The local oscillator envelope bursts of each local oscillator RF component are shown to exceed a pre-determined threshold 260. RF frequency pulses that occur outside of the local oscillator envelope bursts are shown to have amplitudes below the pre-determined threshold 260.

As discussed above, the output of local oscillator signal synthesis source 112 of one embodiment of the present invention is a summation of the two local oscillator signals described above, i.e., a summation of the first local oscillator RF component 202 and the second local oscillator RF component 204. Further embodiments are able to time multiplex any number of signals to create a local oscillator output used to tune a rapidly changing received frequency receiver 102 as is clear from the above discussion. In one embodiment of the present invention, a local oscillator burst includes a first subset of bursts, corresponding to the bursts of the first local oscillator component, and a second subset of bursts, corresponding to the bursts of the second local oscillator component. The second subset of bursts is different from the first subset of bursts. In this embodiment, the first subset of bursts includes RF frequency pulses occurring at a first RF frequency, and the second subset of bursts comprises RF frequency pulses occurring at a second RF frequency. In some embodiments, bursts within the first subset of bursts alternate in time with bursts within the second subset of bursts.

The summation of the two local oscillator signals is also able to include inter-burst RF frequency pulses 264 that occur at least one of before and after each of the at least one local oscillator burst 210, the inter-burst RF frequency pulses 264 have respective effective amplitudes conforming to the effective amplitude pulse shaping envelope.

In some embodiments, local oscillator bursts are each separated by a pre-determined period and inter-burst RF frequency pulses occur during the pre-determined period. The inter-burst RF frequency pulses have an effective amplitude below the predetermined threshold. The inter-burst RF frequency pulses that follow the first subset of burst form a transition from the first RF frequency to the second RF frequency, and inter-burst RF frequency pulses that follow the second subset of burst form a transition from the second RF frequency to the first RF frequency. Such transitions between frequencies are able to include, for example, a gradual transition created by windowing the two local oscillator components or an abrupt change of RF frequency during a selected period of low effective amplitude RF frequency pulses within the inter-burst RF frequency pulses. Other transition techniques are able to be utilized by various embodiments of the present invention.

Modulation of a pulse shaping envelope onto the local oscillator RF output components causes a reduction in the bandwidth of the local oscillator output components as compared to a local oscillator that switches between RF outputs with an effective "square wave" or abrupt changes. As discussed above, unshaped switching of the local oscillator output on-and-off, which is the effective signal representation for a particular local oscillator frequency that switches between two local oscillator radio frequencies without any pulse-shaping (or with square wave "pulses"), results in a sin(x)/x spectrum for the local oscillator. This relatively broadband spectrum for a square wave switched local oscillator radio frequency is able to cause unwanted spurious signal reception or other distortions by a receiver.

The local oscillator signal synthesis source 112 of one embodiment of the present invention includes a direct digital synthesizer (DDS) to directly generate RF pulses to create the two local oscillator RF components discussed above. The local oscillator 112 directly synthesizes a pulse train at the radio frequency to drive mixer 110 in order to receive the desired receive spectrum received frequency spectrum 104. A direct digital synthesizer incorporated into a local oscillator of one embodiment of the present invention is described in U.S. Pat. Ser. No. 6,891,420, the entire contents of which is hereby incorporated herein by reference.

A local oscillator signal synthesis source 112 of one embodiment of the present invention produces a local oscillator signal that has at least one local oscillator burst. Each local oscillator burst in turn has a respective plurality of RF frequency pulses that each has a respective effective amplitude based upon a respective time domain pulse width modulation of each RF frequency pulse. Each of the at least one local oscillator burst has, for a pre-determined duration, RF frequency pulses with an effective amplitude above a pre-determined threshold. Each of the at least one local oscillator burst has RF frequency pulses with respective effective amplitudes that define an effective amplitude pulse shaping envelope for each of the at least one local oscillator burst. The effective amplitude pulse shaping envelope reduces at least one frequency domain component magnitude of the local oscillator signal.

The local oscillator signal synthesis source 112 of one embodiment of the present invention is coupled to a radio frequency mixer that receives an RF signal input and the local oscillator signal. The radio frequency mixer produces an output signal that represents the RF signal input at a frequency related to a combination of a frequency of the RF signal input and a frequency of the local oscillator signal.

Figure 3:
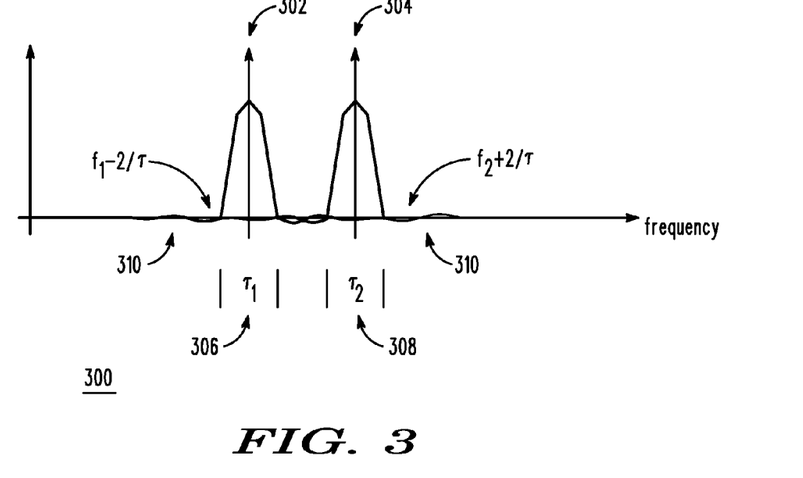
FIG. 3 illustrates a frequency domain representation of the periodically switching local oscillator output illustrated in FIG. 2, according to one embodiment of the present invention.

FIG. 3 illustrates a frequency domain representation 300 for a periodically switching local oscillator output for the local oscillator illustrated in FIG. 2, according to one embodiment of the present invention. The frequency domain of the local oscillator's output shows two main lobe spectral components centered at the two local oscillator RF frequencies, F1 302 and F2 304, which correspond to $F_{lo1}$ and $F_{lo2}$ described above. The amplitude envelope pulse shaping described above for the local oscillator RF components causes a reduction in the bandwidth of the two spectral components illustrated in FIG. 3, including the magnitude of the first spectral lobes 310 which are adjacent in frequency to the two main lobe spectral components. The width of the main lobes of these spectral components is $\tau_1$ 306 and $\tau_2$ 308, which correspond to the duration of the burst for each value of the local oscillator radio frequency output. Some embodiments of the present invention utilize equal values for $\tau_1$ 306 and $\tau_2$ 308 while further embodiments are able to utilize unequal values for $\tau_1$ 306 and $\tau_2$ 308. The reduction in bandwidth of the main lobe spectral components centered at the local oscillator frequencies, as well as the reduction of the spectral side lobes such as the first spectral side lobes 310, causes improved rejection of signals outside of the desired receiver bandwidth.

Figure 4:
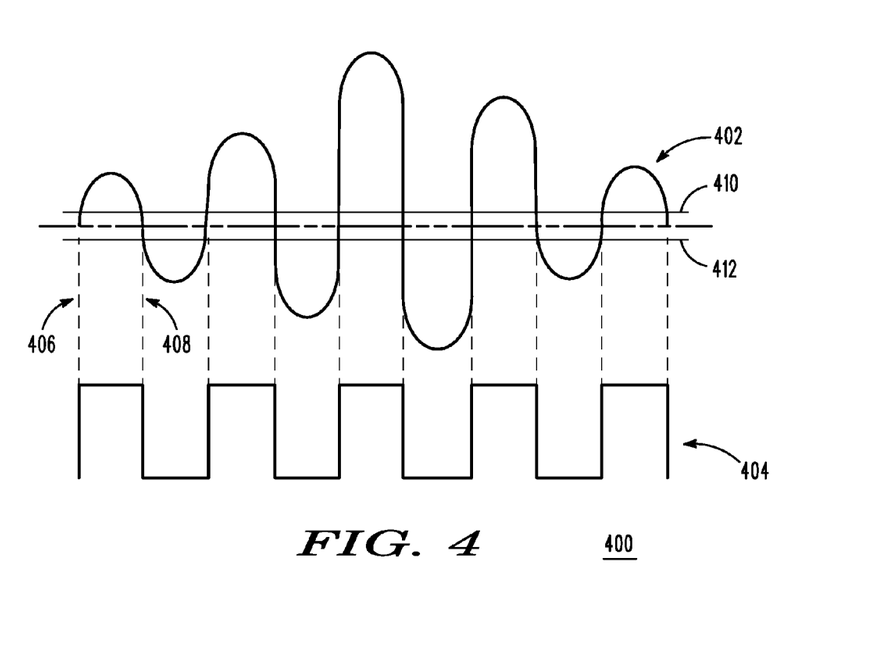
FIG. 4 depicts a relationship between a hard limited response of a switching signal mixer and an amplitude modulated local oscillator input to the switching signal mixer.

FIG. 4 illustrates a hard limited response 400 of a switching signal mixer with respect to an amplitude modulated local oscillator RF input 402, according to one embodiment of the present invention. The conventional mixer 110 of one embodiment of a rapidly changing received frequency receiver 102 uses switching diodes to "mix" the local oscillator RF input with the received radio frequency input. These switching diodes effectively hard limit the local oscillator RF input signal and causes the amplitude envelop of the local oscillator signal to be lost.

The hard limited response 400 shows a conventionally amplitude modulated local oscillator input 402. A simple amplitude envelope for this example is used to provide a clearer description certain features of the rapidly changing received frequency receiver 102. Such amplitude modulation might include a sin(t)/t SINC function in the time domain as is described above. After the hard limiting by the switching diodes of the conventional mixer 110, the effective local oscillator signal is shown as the hard limited signal 404. The hard limiting of one embodiment is illustrated by a positive hard limiting level 410 and a negative hard limiting level 412. As the signal crosses the positive hard limiting level 410 and a negative hard limiting level 412, the hard limited signal 404 changes state. The zero crossings of the amplitude modulated local oscillator input are preserved, but the amplitude information is not maintained by the conventional mixer 110. Such operating characteristics severely limit the effectiveness of pulse shaping of the local oscillator bursts as is described above.

Figure 5:
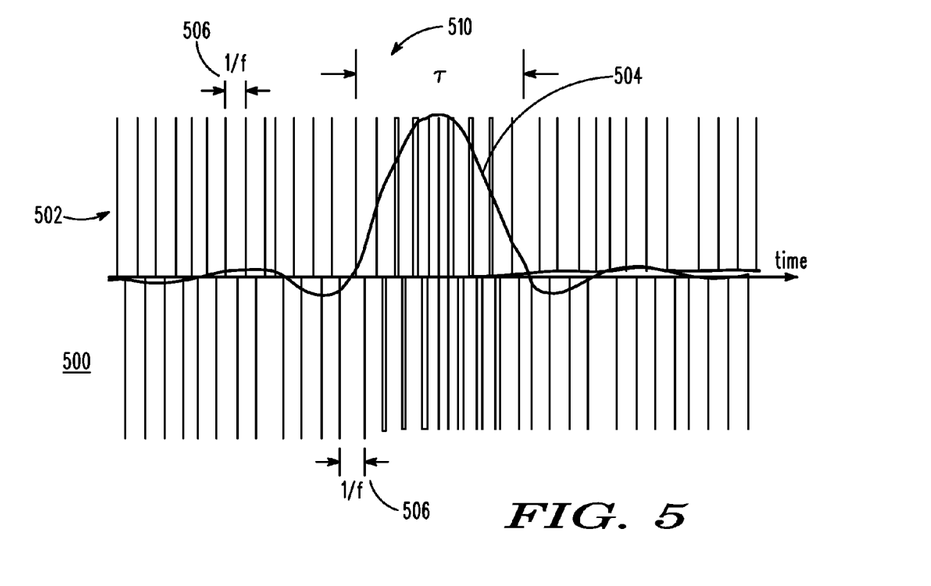
FIG. 5 illustrates a time domain representation of a pulsed shaped three state local oscillator burst with local oscillator burst pulse shaping being achieved through pulse width modulation of RF frequency pulses within the local oscillator burst, according to one embodiment of the present invention.

FIG. 5 illustrates a time domain representation of a three state pulsed shaped local oscillator burst 500 with local oscillator burst pulse shaping being achieved through Pulse Width Modulation (PWM) of RF frequency pulses within the local oscillator burst, according to one embodiment of the present invention. The PWM pulse-shaped local oscillator RF pulse train is effectively amplitude modulated according to an amplitude envelope 504 by pulse width modulation of each RF pulse produced in the RF pulse train 502. The time domain representation of the PWM pulsed shaped local oscillator RF pulse train 502 shows the uniform amplitude and alternating polarity local oscillator RF pulses in the RF pulse train 502 and an effective amplitude envelope 504 for the local oscillator burst containing the pulse train 502. The time duration between each pulse of similar polarity in the pulse train 502 is uniform for a particular local oscillator RF component and is shown to be $1/f$ 506 in this figure. The effective amplitude of the local oscillator signal of one embodiment of the present invention is controlled by changing the pulse width of each RF pulse to create pulses with different amounts of energy due to their different pulse duration. The controlled modulation of the pulse widths of the pulses within the local oscillator RF pulse train 502 in this example results in an effective amplitude envelope 504 that has appreciable amplitude for a duration of $\tau$ 510.

Figure 6:
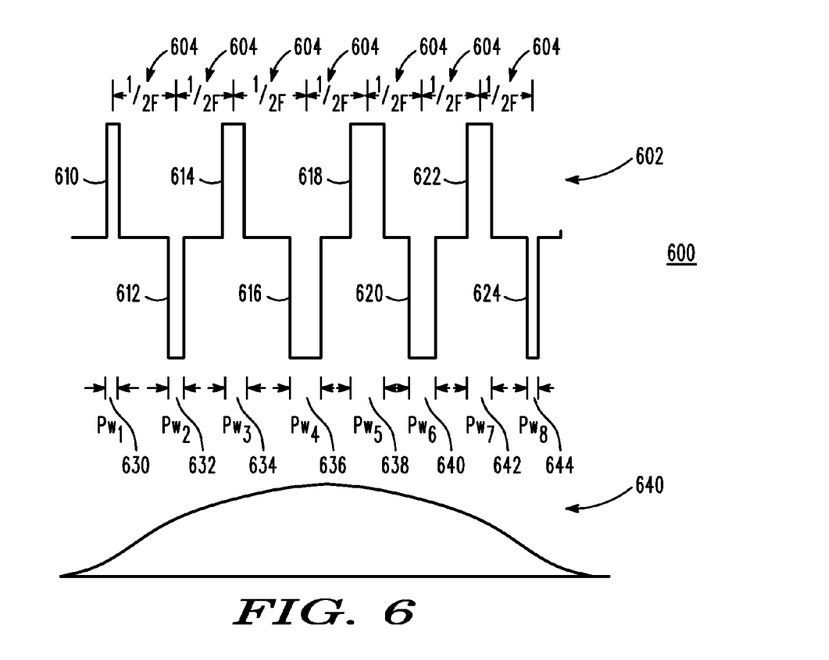
FIG. 6 illustrates an expanded view of a three state local oscillator burst with pulse width modulated, constant three state amplitude RF frequency pulses, in accordance with one embodiment of the present invention.

FIG. 6 illustrates an expanded view of a three state Pulse Width Modulated (PWM), amplitude limited waveform 600 of a pulse shaped local oscillator signal, in accordance with one embodiment of the present invention. The pulse width modulated, amplitude limited waveform 600 illustrates a three state or bi-polar constant amplitude square wave pulse train 602 that includes positive and negative pulses of a local oscillator RF signal produced, for example, by local oscillator signal synthesis source 112 illustrated in FIG. 1. The bi-polar constant amplitude square wave pulse train 602 illustrates that each of RF frequency pulse has a constant peak amplitude. The bi-polar constant amplitude square wave pulse train 602 has alternating positive and negative pulses that have pulse width centers occuring at intervals of $\frac{1}{2} F$ 604, which corresponds to half of the period of the local oscillator radio frequency, represented as "F" in this figure. This causes the bi-polar constant amplitude square wave pulse train 602 to have one positive pulse and one negative pulse during each radio frequency period of the local oscillator.

It is noteworthy that the pulse train 602 illustrates the RF pulses themselves, and not the envelope of a series of RF pulses. One embodiment of the present invention operates by varying the pulse width of RF pulses within the pulse train 602 to perform effective amplitude envelope shaping of a burst of local oscillator RF components.

The radio frequency pulses of the illustrated example of a bi-polar constant amplitude pulse train 602 are shown to be progressively wider and then become narrower as time progresses. For example, the first pulse width 630 of a first pulse 610 is shown to be narrower in time than the third pulse width 634 of a third pulse 614 and those are smaller than a fifth pulse width 638 of a fifth pulse 618. A seventh pulse width 642 of a seventh pulse 622 is smaller than the preceding pulses as the corresponding effective amplitude envelope 604 of the RF pulses is decreasing. A similar relationship is shown for the negative going pulses, where the second pulse width 632 of a second pulse 612 is smaller than a fourth pulse width 636 of a fourth pulse 616. A sixth pulse width 640 of a sixth pulse 620 and an eight pulse width 644 of an eight pulse 624 are shown to be progressively smaller as the corresponding effective amplitude envelope 604 decreases.

The bi-polar constant amplitude square wave pulse train 602 has an effective amplitude envelope 640 due to the pulse width modulation of each radio frequency pulse of the local oscillator signal. One embodiment of the present invention utilizes a digital-to-time converter that accepts a digital representation of the pulse width to be generated and produces a pulse with the specified width. One embodiment of the present invention includes a digital-to-time converter that allows adjusting pulse width to 1024 levels, which is specified by 10 input bits. An example of circuitry used in such a digital-to-time converter to implement pulse width modulation is described in U.S. Pat. Ser. No. 6,998,928, the entire contents of which is hereby incorporated herein by reference.

The local oscillator bursts of one embodiment of the present invention occur periodically with the pulse shaping applied to the RF pulses as described above. This pulse shaping results in additional frequency domain components according to the SINC function envelope. These additional frequency domain components are centered at the RF frequency of the local oscillator output and have discrete frequency components that occur at frequencies corresponding to the oscillator burst rate and integer multiples of the burst rate above and below the RF frequency. The pulse width modulation applied on the individual RF carrier pulses provides pulse shaping and a reduction in the amplitude of these offset spurious components. In addition to the frequency domain response achieved by the above described pulse shaping, further embodiments of the present invention provide additional spurious component amplitude reduction by performing frequency dithering, i.e., by processing the RF frequency oscillator bursts with an intelligent, non-periodic rate, quasi random rate that spreads the discrete spurious components over a frequency bandwidth. Quasi random spurious rejection performance is further able to be improved by adding cognitive local electromagnetic energy environmental measurements to provide a tailored oscillator burst rate for spurious energy spreading without degrading the intended signal's reception quality.

Further embodiments of the present invention further apply a rolloff factor to the SINC function used to perform the above described pulse shaping. The rolloff factor applied by some embodiments of the present invention causes the pulse shaping envelope to decrease in amplitude at points removed from the center of the pulse at a rate faster than that defined by the conventional SINC function.

Figure 7:
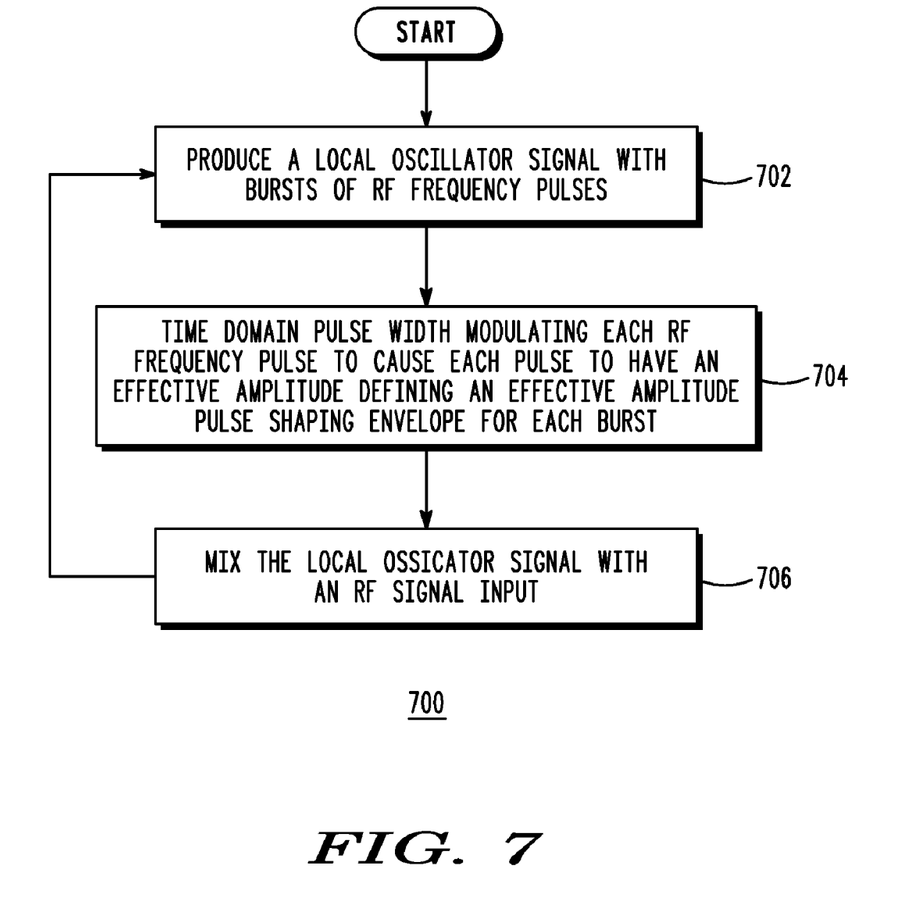
FIG. 7 illustrates a converting a frequency of a radio frequency signal processing flow diagram, in accordance with one embodiment of the present invention.

FIG. 7 illustrates frequency converting of a radio frequency signal processing flow diagram 700, in accordance with one embodiment of the present invention. The frequency converting of a radio frequency signal processing flow 700 begins by producing, at step 702, a local oscillator signal with bursts of RF frequency pulses. The local oscillator signal of one embodiment of the present invention includes at least one local oscillator burst. Each local oscillator burst includes a respective plurality of RF frequency pulses.

The frequency conversion of a radio frequency signal processing flow 700 continues by time domain pulse width modulating, at step 704, each RF frequency pulse within the plurality of RF frequency pulses with a respective time domain pulse width modulation, thereby resulting in a respective effective amplitude each RF frequency pulse within the plurality of RF frequency pulses based upon a respective time domain pulse width modulation. Each of the at least one local oscillator burst has, for a pre-determined duration, RF frequency pulses with an effective amplitude above a pre-determined threshold. Each of the at least one local oscillator burst has RF frequency pulses with respective effective amplitudes that define an effective amplitude pulse shaping envelope for each of the at least one local oscillator burst. The effective amplitude pulse shaping envelope reduces at least one frequency domain component magnitude of the local oscillator signal.

The frequency converting of a radio frequency signal processing flow 700 continues by mixing, at step 706, the local oscillator signal and an RF signal input to produce an output signal representing the RF signal input at a frequency related to a combination of a frequency of the RF signal input and a frequency of the local oscillator signal. The frequency converting of a radio frequency signal processing flow 700 then returns to producing, at step 702, a local oscillator signal as is described above.

Non-Limiting Examples

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A frequency converter for a radio frequency signal, comprising:
    a local oscillator producing a local oscillator signal comprising at least one local oscillator burst, each local oscillator burst within the at least one local oscillator burst comprising a respective plurality of RF frequency pulses, each RF frequency pulse within the plurality of RF frequency pulses having a respective effective amplitude based upon a respective time domain pulse width modulation of each RF frequency pulse,
        wherein each of the at least one local oscillator burst having, for a pre-determined duration, RF frequency pulses with an effective amplitude above a pre-determined threshold,
        wherein each of the at least one local oscillator burst has RF frequency pulses with respective effective amplitudes that define an effective amplitude pulse shaping envelope for each of the at least one local oscillator burst, the effective amplitude pulse shaping envelope reducing at least one frequency domain component magnitude of the local oscillator signal; and
    a radio frequency mixer, communicatively coupled to the local oscillator, the radio frequency mixer receiving an RF signal input and the local oscillator signal and producing an output signal representing the RF signal input at a frequency related to a combination of a frequency of the RF signal input and a frequency of the local oscillator signal.

2. The frequency converter of claim 1, wherein the local oscillator signal comprises inter-burst RF frequency pulses that occur at least one of before and after each of the at least one local oscillator burst, the inter-burst RF frequency pulses having respective effective amplitudes conforming to the effective amplitude pulse shaping envelope.

3. The frequency converter of claim 1, wherein the plurality of RF frequency pulses are produced by a direct digital synthesizer, the direct digital synthesizer accepting an input to specify an RF frequency of each RF frequency pulse within the plurality of RF frequency pulses.

4. The frequency converter of claim 1, wherein the plurality of RF frequency pulses within the at least one local oscillator burst occur at a non-periodic, quasi random oscillator burst rate.

5. The frequency converter of claim 1, wherein each of RF frequency pulse within the plurality of frequency pulses has a constant peak amplitude.

6. The frequency converter of claim 1, wherein the effective amplitude pulse shaping envelope is defined by a sin(t)/t SINC function.

7. The frequency converter of claim 6, wherein a time domain rolloff factor is applied to the SINC function.

8. The frequency converter of claim 1, wherein the respective time domain pulse width modulation of each of the RF frequency pulse within the plurality of RF frequency pulses is performed by a digital-to-time converter.

9. The frequency converter of claim 8, wherein the respective time domain pulse width modulation of a subset of RF frequency pulses within the plurality of RF frequency pulses comprises pulse width dithering to achieve a respective average effective amplitude for the subset of RF frequency pulses that is between available effective amplitudes defined by a pulse width resolution of the digital-to-time converter.

10. The frequency converter of claim 1, wherein the at least one local oscillator burst comprises a plurality of local oscillator bursts, and wherein the plurality of local oscillator bursts comprises a first subset of bursts and a second subset of bursts different from the first subset of bursts, wherein the first subset of bursts comprises RF frequency pulses occurring at a first RF frequency, and wherein the second subset of bursts comprises RF frequency pulses occurring at a second RF frequency.

11. The frequency converter of claim 10, wherein bursts within the first subset of bursts alternate in time with bursts within the second subset of bursts.

12. The frequency converter of claim 11, wherein local oscillator bursts in the plurality of local oscillator bursts are each separated by a pre-determined period, wherein the local oscillator signal further comprises inter-burst RF frequency pulses during the pre-determined period, the inter-burst RF frequency pulses having an effective amplitude below the pre-determined threshold, wherein inter-burst RF frequency pulses following the first subset of burst transition from the first RF frequency to the second RF frequency, and inter-burst RF frequency pulses following the second subset of burst transition from the second RF frequency to the first RF frequency.

13. A method for converting a frequency of a radio frequency signal, the method comprising:
    producing a local oscillator signal comprising at least one local oscillator burst, each local oscillator burst within the at least one local oscillator burst comprising a respective plurality of RF frequency pulses
    time domain pulse width modulating each RF frequency pulse within the plurality of RF frequency pulses with a respective time domain pulse width modulation thereby resulting in a respective effective amplitude each RF frequency pulse within the plurality of RF frequency pulses based upon a respective time domain pulse width modulation,
        wherein each of the at least one local oscillator burst having, for a pre-determined duration, RF frequency pulses with an effective amplitude above a pre-determined threshold,
        wherein each of the at least one local oscillator burst has RF frequency pulses with respective effective amplitudes that define an effective amplitude pulse shaping envelope for each of the at least one local oscillator burst, the effective amplitude pulse shaping envelope reducing at least one frequency domain component magnitude of the local oscillator signal; and
    mixing an RF signal input and the local oscillator signal to produce an output signal representing the RF signal input at a frequency related to a combination of a frequency of the RF signal input and a frequency of the local oscillator signal.

14. The method of claim 13, wherein the effective amplitude pulse shaping envelope is defined by a sin(t)/t SINC function.

15. The method of claim 13, wherein the local oscillator signal comprises inter-burst RF frequency pulses that occur at least one of before and after each of the at least one local oscillator burst, the inter-burst RF frequency pulses having respective effective amplitudes conforming to the effective amplitude pulse shaping envelope.

16. The method of claim 13, wherein the plurality of RF frequency pulses are produced by a direct digital synthesizer, the direct digital synthesizer accepting an input to specify an RF frequency of each RF frequency pulse within the plurality of RF frequency pulses, and wherein the respective time domain pulse width modulation of each of the RF frequency pulse within the plurality of RF frequency pulses is performed by a digital-to-time converter.

17. The method of claim 16, wherein the respective time domain pulse width modulation of a subset of RF frequency pulses within the plurality of RF frequency pulses comprises pulse width dithering to achieve a respective average effective amplitude for the subset of RF frequency pulses that is between available effective amplitudes defined by a pulse width resolution of the digital-to-time converter.

18. The method of claim 13, wherein the at least one local oscillator burst comprises a plurality of local oscillator bursts, and wherein the plurality of local oscillator bursts comprises a first subset of bursts and a second subset of bursts different from the first subset of bursts, wherein the first subset of bursts comprises RF frequency pulses occurring at a first RF frequency, and wherein the second subset of bursts comprises RF frequency pulses occurring at a second RF frequency, wherein bursts within the first subset of bursts alternate in time with bursts within the second subset of bursts.

19. The method of claim 18, wherein local oscillator bursts in the plurality of local oscillator bursts are each separated by a pre-determined period, wherein the local oscillator signal further comprises inter-burst RF frequency pulses during the pre-determined period, the inter-burst RF frequency pulses having an effective amplitude below the pre-determined threshold, wherein inter-burst RF frequency pulses following the first subset of burst transition from the first RF frequency to the second RF frequency, and inter-burst RF frequency pulses following the second subset of burst transition from the second RF frequency to the first RF frequency.

20. A rapidly changing received frequency receiver, comprising:

an RF signal processor adapted to receive RF signals and produced a conditioned received RF signal;

a local oscillator producing a local oscillator signal comprising at least one local oscillator burst, each local oscillator burst within the at least one local oscillator burst comprising a respective plurality of RF frequency pulses, each RF frequency pulse within the plurality of RF frequency pulses having a respective effective amplitude based upon a respective time domain pulse width modulation of each RF frequency pulse, wherein each of the at least one local oscillator burst having, for a pre-determined duration, RF frequency pulses within an effective amplitude above a pre-determined threshold, wherein each of the at least one local oscillator burst has RF frequency pulses with respective effective amplitudes that define an effective amplitude pulse shaping envelope for each of the at least one local oscillator burst, the effective amplitude pulse shaping envelope reducing at least one frequency domain component magnitude of the local oscillator signal;

a radio frequency mixer, communicatively coupled to the local oscillator and the RF signal processor, the radio frequency mixer accepting the conditioned received RF signal and the local oscillator signal, the radio frequency mixer producing an output signal representing the RF signal input at a frequency related to a combination of a frequency of the RF signal input and a frequency of the local oscillator signal.

* * * * *